US008327133B2

(12) United States Patent
Ohara

(10) Patent No.: US 8,327,133 B2
(45) Date of Patent: Dec. 4, 2012

(54) COMMUNICATION DEVICE AND MEDIUM FOR THE SAME

(75) Inventor: Kiyotaka Ohara, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 1431 days.

(21) Appl. No.: 11/727,956

(22) Filed: Mar. 29, 2007

(65) Prior Publication Data

US 2007/0234059 A1 Oct. 4, 2007

(30) Foreign Application Priority Data

Mar. 31, 2006 (JP) ................................. 2006-098709

(51) Int. Cl.
*H04L 29/06* (2006.01)
(52) U.S. Cl. ....................... 713/158; 713/155
(58) Field of Classification Search .................. 713/155, 713/158
See application file for complete search history.

(56) References Cited

U.S. PATENT DOCUMENTS

| | | | | |
|---|---|---|---|---|
| 2002/0194471 A1* | 12/2002 | Benantar et al. | ............. | 713/158 |
| 2004/0068650 A1* | 4/2004 | Resnitzky et al. | ............. | 713/155 |
| 2005/0228998 A1* | 10/2005 | Chan et al. | ............. | 713/175 |
| 2006/0053276 A1* | 3/2006 | Lortz et al. | ............. | 713/2 |
| 2007/0005979 A1* | 1/2007 | Ishii | ............. | 713/176 |

FOREIGN PATENT DOCUMENTS

| | | |
|---|---|---|
| JP | 2001-320355 | 11/2001 |
| JP | 2002-215826 | 8/2002 |
| JP | 2003-304235 | 10/2003 |
| JP | 2004-302835 | 10/2004 |
| JP | 2005-301548 | 10/2005 |

OTHER PUBLICATIONS

Japanese Official Action dated Nov. 5, 2009 with English translation.
ISO/IEC 11770-1: "Information technology—Security techniques—Key management—Part 1: Framework", International Organization for Standardization, Dec. 15, 1996, pp. 1-21.
Toyao, Chikara, "Safe Information & Telecommunications and Productions for IT", NTT Technical Review, May 1, 1997, pp. 86-89, vol. 9, No. 5.
Ford, Warwick et al., Building the Infrastructure for Digital Signatures and Encryption, Dec. 24, 1997, pp. 182-194, Prentice-Hall, Inc.

* cited by examiner

*Primary Examiner* — Brandon Hoffman
*Assistant Examiner* — Thong Truong
(74) *Attorney, Agent, or Firm* — Scully, Scott, Murphy & Presser, PC

(57) ABSTRACT

A communication device configured to perform communication with at least one external device via a network using a secret key and an electronic certificate that includes information on a public key corresponding to the secret key, includes a storing system configured to store the secret key and the electronic certificate, a receiving system configured to receive an instruction to delete at least one of the secret key and the electronic certificate stored in the storing system, a revocation instructing system configured to instruct, via the network, a management device that manages a list of revoked electronic certificates to register the electronic certificate stored in the storing system with the list in response to the received instruction, and a deleting system configured to delete the at least one of the secret key and the electronic certificate in response to the received instruction.

9 Claims, 6 Drawing Sheets

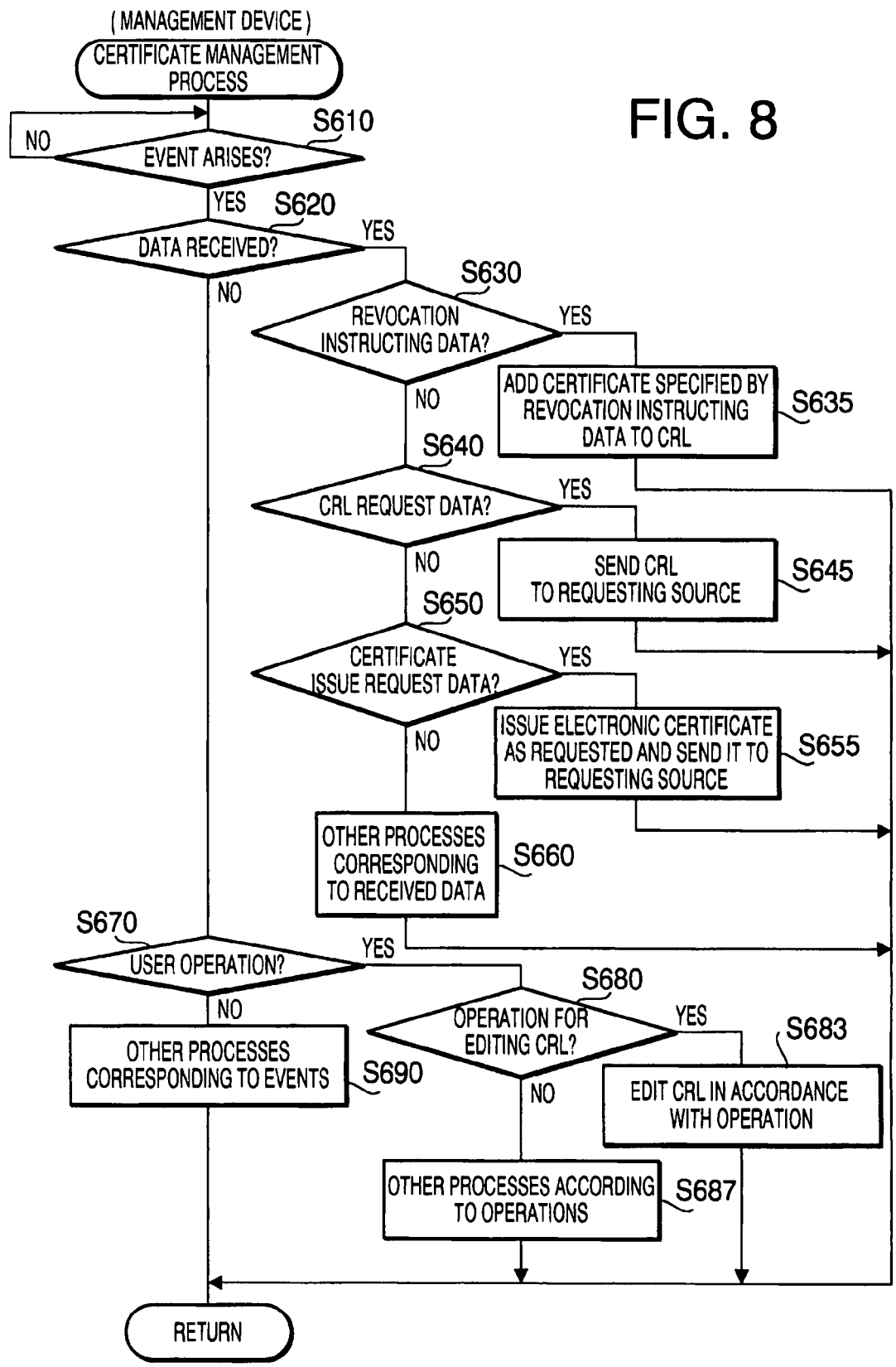

COMMUNICATION DEVICE AND MEDIUM FOR THE SAME

CROSS-REFERENCE TO RELATED APPLICATION

This application claims priority under 35 U.S.C. §119 from Japanese Patent Application No. 2006-098709, filed on Mar. 31, 2006. The entire subject matter of the application is incorporated herein by reference.

BACKGROUND

1. Technical Field

The following description relates to one or more techniques for communicating with other devices via a network by using a secret key and an electronic certificate including information on a public key corresponding to the secret key.

2. Related Art

Conventionally, there is known a communication technology using an electronic certificate (for example, see Japanese Patent Provisional Publication No. 2004-302835). In addition, an SSL (Secure Socket Layer) communication technology is known as the communication technology using the electric certificate. In order to attain the SSL communication, it is required to generate a pair of a secret key and a public key and to request a CA (Certificate Authority) to issue the electric certificate regarding the public key prior to performing the communication. Then, the generated secret key and electronic certificate are installed into a server device with which the SSL communication is to be performed.

When an initial signal for an SSL handshake has been transmitted from a client device to the server device into which the secret key and electronic certificate are installed as aforementioned, the server device sends the electronic certificate to the client device.

When the electronic certificate has been received from the server device, the client device judges whether the electronic certificate as received is proper. For instance, the client device evaluates a digital signature of the electronic certificate as received based on the digital signature and the CA certificate, and judges whether the electronic certificate has been falsified. Further, based on validity period information included in the electronic certificate, it is judged whether the electronic certificate is expired.

Additionally, in order to judge whether the electronic certificate is revoked, the client device acquires a CRL (Certificate Revocation List) managed by a management device such as the CA from the management device. Then, the client device checks the electronic certificate against the acquired CRL to judge whether the electronic certificate acquired from the server device is revoked.

When the electronic certificate is judged to be valid, the client device trusts the server device and performs following procedures. Specifically, encrypted communication between the server device and the client device is performed using the secret key and public key, so as to arrange a session key (common key). Thereafter, the encrypted communication using the session key is performed. In the meantime, when the electronic certificate is not judged to be valid based on the CRL, the following procedures are not performed and the communication is broken to prevent masquerading.

Meanwhile, in order to attain high-security communication using the SSL communication technology, it is required to always reflect the latest information in the aforementioned CRL. This is because even though the electronic certificate is not expired, when the client device trusts the server device only based on the electronic certificate, a communication security problem might be caused.

For example, the secret key and electronic certificate may be deleted from a memory area of the server device due to initialization of the server device, and may not be used at the server device side. In addition, an administrator of the server device may delete the secret key and electronic certificate that have been used so far in order to prevent the secret key from being stolen and abused, and may introduce a new secret key and a new electronic certificate into the server device, even though the electronic certificate is not expired.

Here, assuming the secret key and electronic certificate have already been stolen before the secret key and electronic certificate are deleted from the server device, a false server device might masquerade as the proper server device by using the secret key and electronic certificate that had been used by the proper server device until they were stolen.

In this case, when the electronic certificate is not registered in the CRL, the client device may judge that an electronic certificate transmitted from the false server device is proper, and may continue the communication.

Namely, when there is not registered in the CRL information on revocation of the electronic certificates that is not used by the proper server device any more, the communication security is significantly reduced. However, in a conventional system, the management device that manages the CRL cannot detect the secret key or electronic certificate that has been deleted from each server device. Therefore, a large amount of labor is required for registering, into the CRL, information on the electronic certificates that are not used by the server device any more due to initializing the server device or updating the secret key, since large portion of the operation for registering the information into the CRL is manually performed.

SUMMARY

Aspects of the present invention are advantageous in that there can be provided one or more improved techniques that make it possible to certainly register, into a list of revoked electronic certificates, information on an electronic certificate that is not used by a server device any more due to initializing the server device or updating the electronic certificate.

BRIEF DESCRIPTION OF THE ACCOMPANYING DRAWINGS

FIG. 1 schematically shows a configuration of a communication system in accordance with one or more aspects of the present invention.

FIG. 2 schematically shows a configuration of an electronic certificate in accordance with one or more aspects of the present invention.

FIG. 3 schematically shows SSL communication in the communication system in accordance with one or more aspects of the present invention.

FIG. 8 is a flowchart showing a procedure of a certificate management process to be repeatedly executed by a CPU of a management device in accordance with one or more aspects of the present invention.

DETAILED DESCRIPTION

Figure 1:
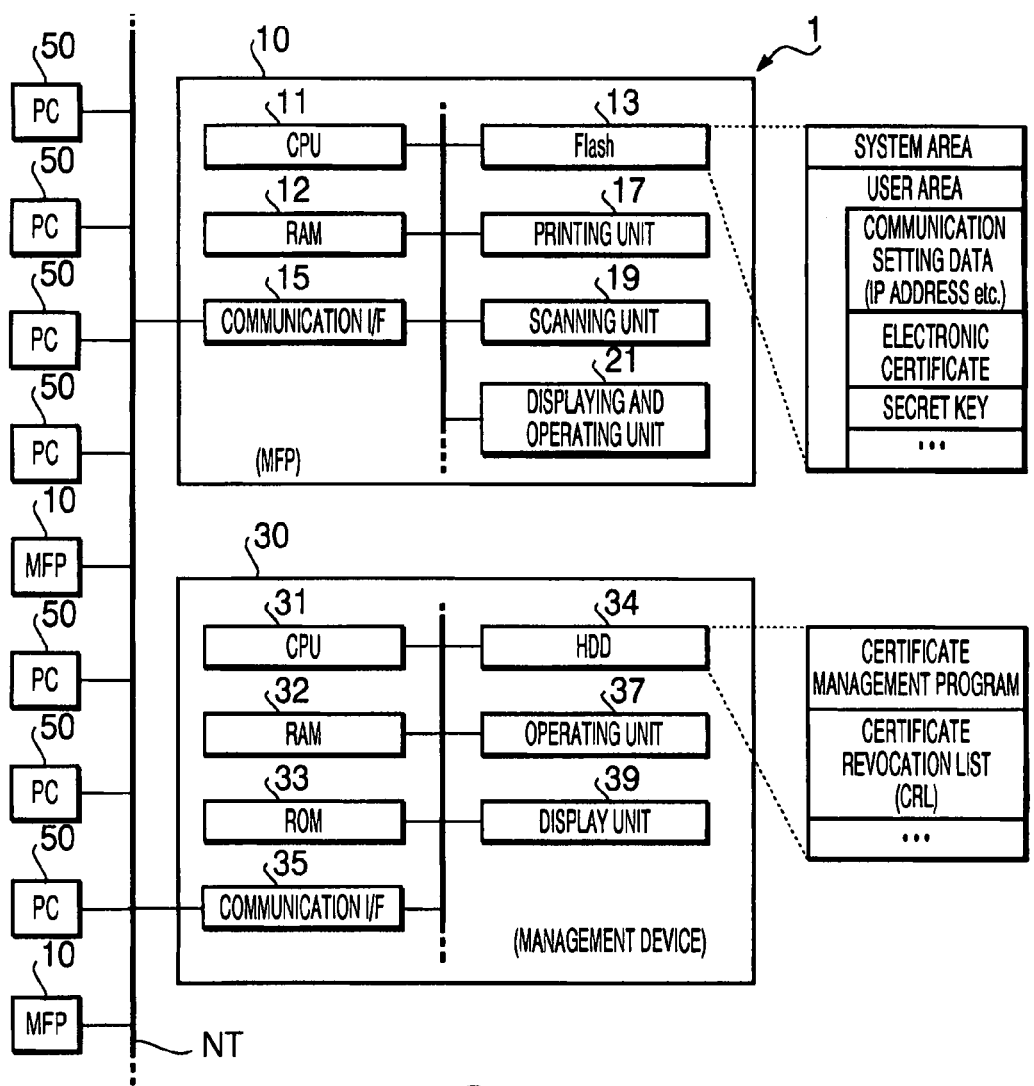

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

General Overview

According to aspects of the present invention, there is provided a communication device configured to perform communication with at least one external device via a network using a secret key and an electronic certificate that includes information on a public key corresponding to the secret key, which includes a storing system configured to store the secret key and the electronic certificate, a receiving system configured to receive an instruction to delete at least one of the secret key and the electronic certificate stored in the storing system, a revocation instructing system configured to instruct, via the network, a management device that manages a list of revoked electronic certificates to register the electronic certificate stored in the storing system with the list in response to the instruction received by the receiving system, and a deleting system configured to delete the at least one of the secret key and the electronic certificate stored in the storing system in response to the received instruction.

According to some aspects, it is possible to certainly register, with the list of revoked electronic certificates, information on the electronic certificate to be revoked when the at least one of the stored secret key and electronic certificate is deleted in response to the instruction that is, for example, inputted by a user. Thereby, the communication security can be more assured than a communication device to which the present invention is not applied.

Optionally, the receiving system may be configured to receive an instruction to initialize communication settings for the communication device. In this case, the deleting system may include an initializing system configured to delete the secret key and electronic certificate stored in the storing system so as to initialize the communication settings for the communication device in response to the instruction received by the receiving system.

In a communication device such as a network printer that stores setting information regarding communication operation as user data in a memory such as a flash memory and an EEPROM, when a user inputs an initializing instruction by pressing a reset button or the like, the user data stored in the memory are completely deleted once. In this case, each parameter of the setting information is set to be an initial value (factory default value), and the electronic certificate and secret key recorded as the user data in the memory are deleted as well.

In some aspects, assuming the aforementioned situation, the communication device is configured to instruct the management device to register the electronic certificate to be deleted in response to the initializing instruction with the list of revoked electronic certificates.

Therefore, it is possible to certainly register the electronic certificate to be deleted due to the initializing operation with the list of revoked electronic certificates, so that the communication security can be more assured.

Optionally, the receiving system is configured to receive an instruction to register a second secret key and a second electronic certificate that includes information on a second public key corresponding to the second secret key into the storing system. In this case, the deleting system may include a registering system configured to delete the secret key and electronic certificate stored in the storing system so as to register the second secret key and the second electronic certificate that includes the information on the second public key corresponding to the second secret key into the storing system in response to the instruction received by the receiving system.

According to some aspects, it is possible to certainly register, with the list of revoked electronic certificates, the electronic certificate to be deleted due to the registering operation performed in response to the registering instruction. Therefore, the communication security can be assured.

Optionally, the deleting system may be configured to delete the at least one of the secret key and electronic certificate stored in the storing system after the electronic certificate has been registered with the list in response to the instructing operation by the revocation instructing system.

According to some aspects, the operation of registering the information on the electronic certificate stored in the storing system with the list of revoked electronic certificates is performed before deleting the at least one of the secret key and the electronic certificate. Accordingly, it is possible to certainly register, with the list of revoked electronic certificates, the electronic certificate to be revoked when the at least one of the stored secret key and electronic certificate is deleted. Thereby, the communication security can be further assured.

An address of the management device, which is to be instructed to register the electronic certificate to be deleted with the list of revoked electronic certificates, may be acquired by a user operation and registered in the flash memory or the EEPROM of the communication device. However, in such a case, when the address is not registered through default of the user, the communication device cannot instruct the management device to register the electronic certificate to be deleted with the list.

Accordingly, the electronic certificate stored in the storing system may include address information on an address of the management device that manages the list of revoked electronic certificates. Further, the revocation instructing system may be configured to instruct the management device represented by the address information included in the electronic certificate stored in the storing system to register the electronic certificate with the list.

According to some aspects, the communication device can send, to the management device, the instruction for registering the electronic certificate to be revoked when the at least one of the stored secret key and electronic certificate is deleted with the list of revoked electronic certificates, based on the address information included in the electronic certificate. Therefore, it is possible to certainly register the electronic certificate to be revoked with the list, so that the communication security can be further assured.

According to another aspect of the present invention, there is provided a computer usable medium having computer readable instructions stored thereon, which, when executed by a computer that stores a secret key and an electronic certificate corresponding to the secret key as information for communication in a predetermined memory area, cause the computer to perform steps of receiving an instruction to delete at least one of the secret key and the electronic certificate stored in the predetermined memory area, instructing a management device that manages a list of revoked electronic certificates to register the electronic certificate stored in the predetermined memory area in response to the received instruction with the list, and deleting the at least one of the secret key and the electronic certificate stored in the predetermined memory area in response to the received instruction.

According to the computer usable medium configured as above, the same effects as the aforementioned communication device can be expected. Namely, since it is possible to certainly register the electronic certificate to be revoked with the list of revoked electronic certificates, the communication security can be more assured.

Illustrative Aspects

Hereinafter, an embodiment according to aspects of the present invention will be described with reference to the accompanying drawings. FIG. 1 schematically shows a configuration of a communication system 1. As shown in FIG. 1, the communication system 1 in the embodiment is configured with digital MFPs (Multi Functional Peripherals) 10, a management device 30 that manages an electronic certificate, and personal computers (hereinafter, simply referred to as "PCs") 50 of respective users being interconnected via a TCP/IP network NT.

Each of the MFPs 10 includes a CPU 11, a RAM 12 as a working memory, a flash memory 13 that stores various programs and data, a communication interface (communication I/F) 15 connected with the network NT, a printing unit 17 that forms an image on a printing paper with a laser printing method or an inkjet printing method, a scanning unit 19 that optically scans an original image (text) placed on a stage to generate image data, a displaying and operating unit 21 as a user interface provided with various user-operable keys and a display device. The MFP 10 runs various programs with the CPU 11 to attain a TCP/IP communication function, an SSL communication function, a printer function, a scanner function, a copy function, and the like.

In particular, the MFP 10 is provided with a non-rewritable system area and a rewritable user area in the flash memory 13. There are stored in the system area various programs and data required for operation of the MFP 10. Meanwhile, in the user area, there are stored data that are generated or modified as required in response to use of the MFP 10.

For example, the MFP 10 has communication setting data that represent setting information required for the TCP/IP communication in the user area of the flash memory 13. The MFP 10 performs communication with another device on the network NT based on information such as an IP address, a subnet mask, and a default gateway included in the communication setting data.

In addition, when an update command that instructs to update a key is inputted, the MFP 10 installs an secret key and an electronic certificate (server certificate) corresponding to the secret key into the user area of the flash memory 13. Further, in response to an access to a port for the SSL communication from one of the external PCs 50, the MFP 10 performs a handshake process for the SSL communication with the PC 50. After the handshake process has normally been completed, the MFP 10 performs encrypted communication with the PC 50, and, for example, receives encrypted printing data. Then, the MFP 10 performs a printing process based on the printing data (printer function).

Further, when a scanning command is inputted by a user operation on the displaying and operating unit 21, the MFP 10 controls the scanning unit 19 to generate image data representing an image obtained by scanning an original image (text) placed on the stage and to temporarily store the generated image data. The image data as temporarily stored are transmitted to a corresponding one of the PCs 50 via the communication I/F 15 if required (scanner function).

Meanwhile, the management device 30 includes a CPU 31, a RAM 32 as a working memory area, a ROM 33 that stores a boot program and the like, an HDD (Hard Disk Drive) 34, a communication interface (communication I/F) 35 connected with the network NT, an operating unit 37 provided with a keyboard and pointing device, and display unit 39 provided with a liquid crystal monitor.

The management device 30 attains the TCP/IP communication function and SSL communication function by running various programs. Additionally, the management device 30 in the embodiment stores a certificate management program and a CRL (Certificate Revocation List) as a list of expired electronic certificates in the HDD 34. The management device 30 attains a function of the CA (Certificate Authority) that issues the electronic certificate, and a function of the management device that manages the CRL.

Figure 2:
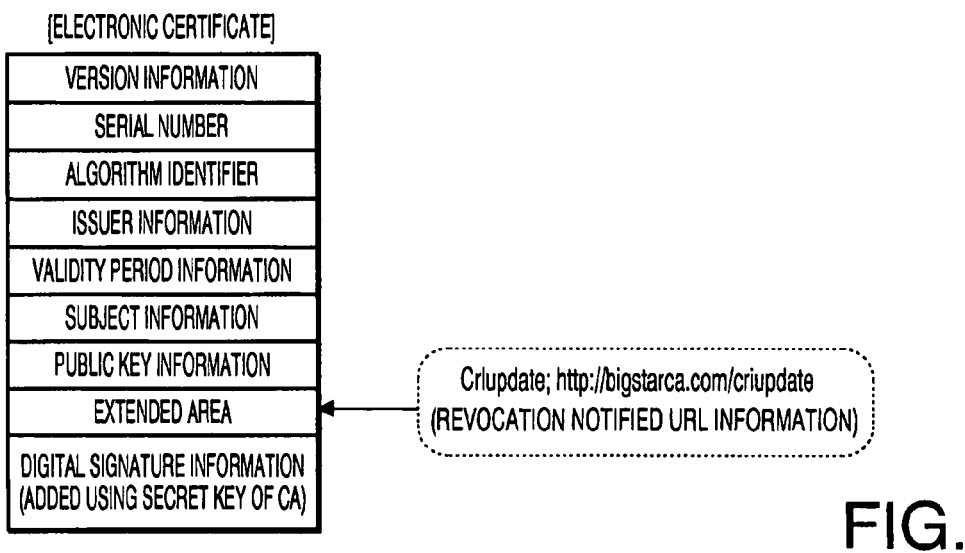

FIG. 2 is an illustration schematically showing a configuration of the electronic certificate issued by the certificate management program. When receiving certificate issue request data that request to issue an electronic certificate from one of the MFPs 10, the management device 30 generates an electronic certificate regarding a public key received from the MFP 10, and issues (sends) the generated electronic certificate to the MFP 10 as a requesting source.

The electronic certificate issued by the aforementioned operation includes, as shown in FIG. 2, version information that represents a version of the certificate, a serial number of the certificate, an algorithm identifier, issuer information that represents a certificate issuer (management device 30) which has given a digital signature on the certificate, validity period information that represents a validity period of the certificate, subject information that represents an owner of the certificate (MFP 10 as a destination to which the certificate is to be issued), public key information that represents a public information, and digital signature information that represents a digital signature value. In addition, in the embodiment, when generating the electronic certificate, there is written by the management device 30 into an extended area of the electronic certificate revocation notified URL information as a contact point to be notified of revocation of the electronic certificate in the case of requesting to revoke the electronic certificate.

In addition, each of the PCs 50 in the communication system 1 is configured in the same manner as a widely known personal computer. Each of the PCs 50 runs various programs with a CPU (not shown) to attain the TCP/IP communication function and the SSL communication function. Specifically, each of the PCs 50 is configured to send to the MFP 10 the printing data in an encrypted state by the SSL communication function. In other words, each of the PCs 50 can secretly send the printing data to the MFP 10 by the encrypted communication and can make the MFP 10 perform the printing operation based on the printing data.

It is noted that each of the PCs 50 evaluates the electronic certificate (server certificate) transmitted by the MFP 10 in the SSL communication in a widely known manner. When the electronic certificate is judged valid, the communication is continued. Meanwhile, when the electronic certificate is not judged valid, a process to break the communication is performed.

Figure 3:
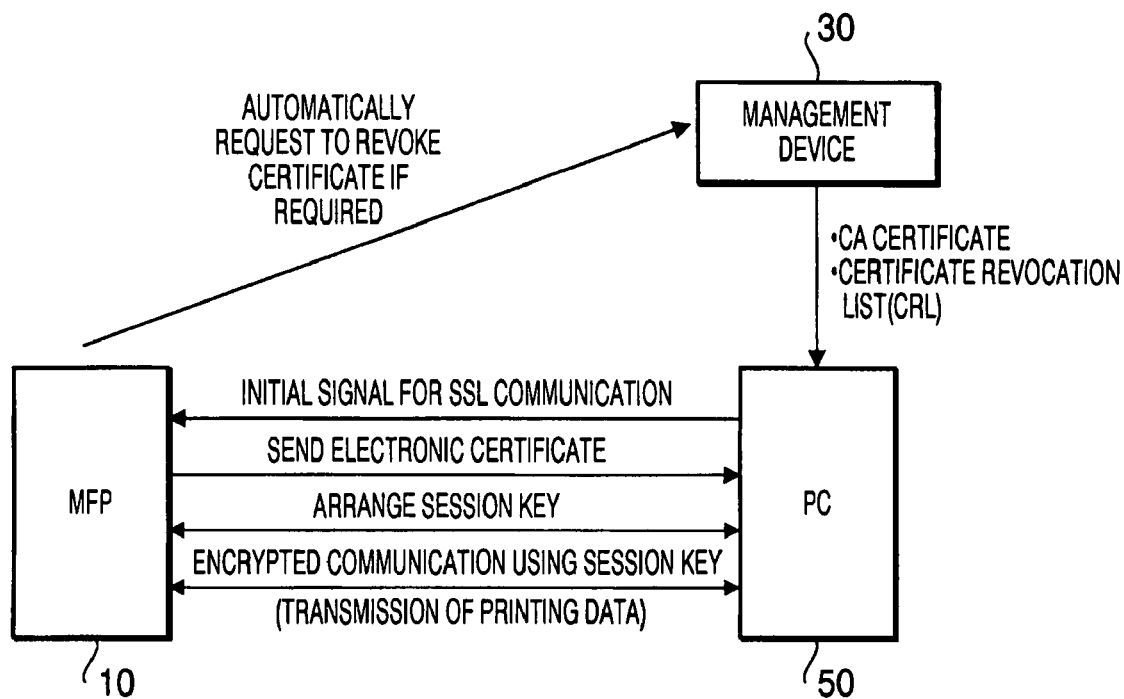

FIG. 3 is an illustration schematically showing the SSL communication performed between the PC 50 and MFP 10. A handshake process required for the SSL communication is started by sending an initial signal (Client Hello Message) of the SSL communication from the PC 50 as a client device to the MFP 10 as a server device. When receiving the initial signal, the MFP 10 sends to the PC 50 the electronic certificate (server certificate) installed therein via the network NT. Meanwhile, when receiving the electronic certificate from the MFP 10, the PC 50 judges whether the received electronic certificate is valid based on the CA certificate or CRL.

Specifically, the PC 50 decrypts the digital signature information of the received electronic certificate (see FIG. 2) based on the CA certificate acquired from the management device 30, and judges whether the electronic certificate received from the MFP 10 has been falsified by checking whether a hash value obtained by the decryption is identical to a hash value obtained from another information included in the electronic certificate.

Additionally, the PC 50 judges whether the received electronic certificate is expired based on the validity period information included in the electronic certificate, and further judges whether the MFP 10 which has transmitted the electronic certificate is identical to the owner of the electronic certificate represented by the subject information included in the electronic certificate.

Furthermore, the PC 50 acquires the CRL managed by the management device 30 from the management device 30 to judge whether the electronic certificate is revoked. Then, the PC 50 judges whether the received electronic certificate is registered in the CRL (that is, whether the received electronic certificate is a revoked electronic certificate) by checking a serial number of the received electronic certificate against serial numbers of the electronic certificates registered in the CRL acquired.

Then, when the electronic certificate is judged to be transmitted from the owner thereof, not falsified, not expired, and not registered in the CRL, the encrypted communication is performed using the public key included in the electronic certificate, so as to arrange a session key. When the session key has normally been arranged and the handshake process has normally been completed, the PC 50 performs the encrypted communication with the MFP 10 using the session key as arranged. Then, for example, the PC 50 encrypts the printing data and sends the encrypted printing data to the MFP 10, so as to make the MFP 10 perform the printing process.

In the meantime, an electronic certificate (server certificate) that is not used by the MFP 10 any more might be abused in the case where the electronic certificate is not registered in the CRL.

Accordingly, in the embodiment, each of the MFPs 10 is provided with functions of detecting an electronic certificate that is not used thereby and automatically requesting to revoke the electronic certificate. Thereby, the electronic certificate that is not used by each of the MFPs 10 is certainly and promptly registered in the CRL managed by the management device 30.

Figure 4:
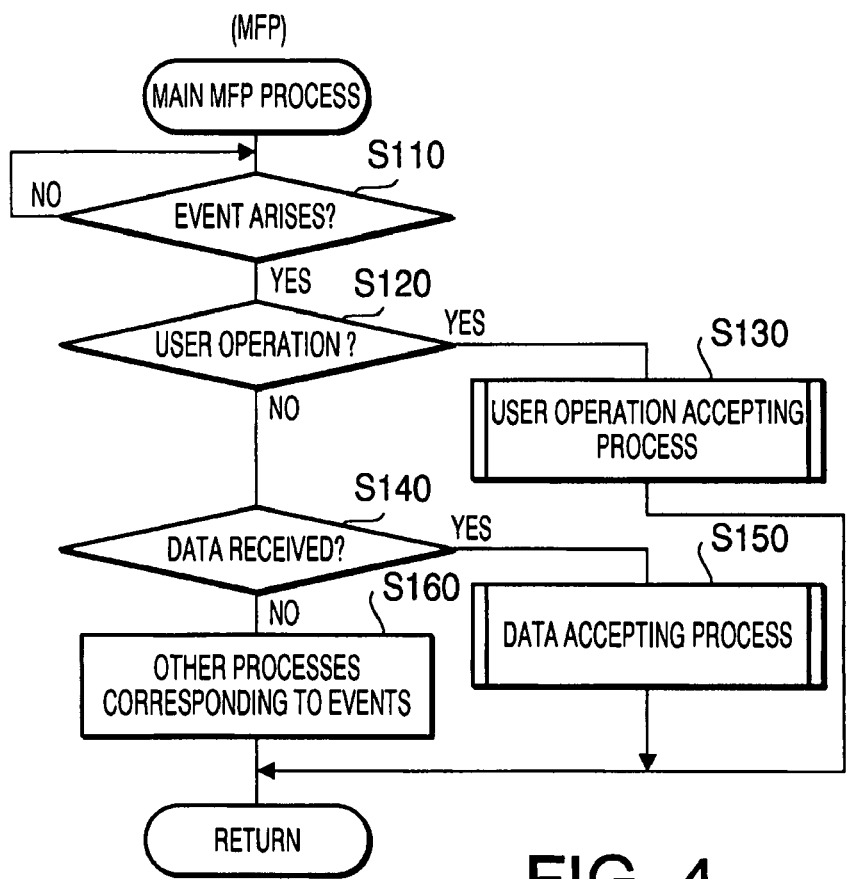
FIG. 4 is a flowchart showing a procedure of a main MFP process to be repeatedly executed by a CPU of an MFP in accordance with one or more aspects of the present invention.

FIG. 4 is a flowchart showing a main MFP process to be repeatedly executed by the CPU 11 of the MFP 10 configured as above. When starting the main MFP process, the CPU 11 of the MFP 10 keeps waiting ready until any event arises in the MFP 10 (S110). When an event arises (S110: Yes), the process goes to a step of S120, and performs a process corresponding to a sort of the event in the subsequent steps.

Figure 5:
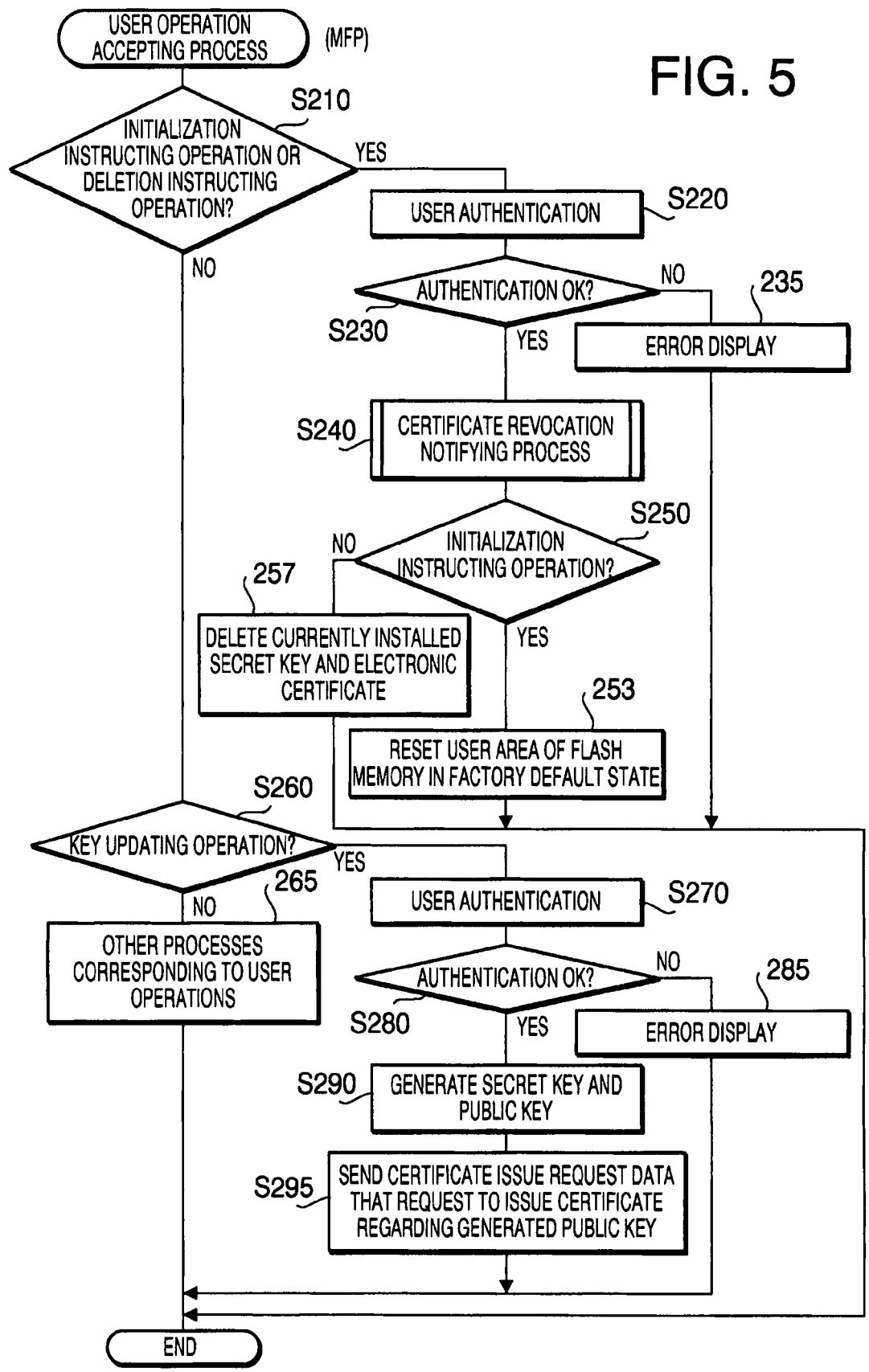
FIG. 5 is a flowchart showing a procedure of a user operation accepting process to be executed by the CPU of the MFP in accordance with one or more aspects of the present invention.

Specifically, in S120, the CPU 11 judges whether the event that has arisen is a user operation event in which a user operation is performed through the displaying and operating unit 21. Namely, the CPU 11 judges whether a user of the MFP 10 has given any operation to the MFP 10 through the displaying and operating unit 21. When it is judged that the event that has arisen is the user operation event (S120: Yes), the process goes to a step of S130, and a user operation accepting process as shown in FIG. 5 is performed. Thereby, the CPU 11 performs a process corresponding to the operation on the displaying and operating unit 21. Thereafter, the main MFP process is once terminated, and the CPU 11 keeps waiting ready until a subsequent event arises (S110).

Figure 7:
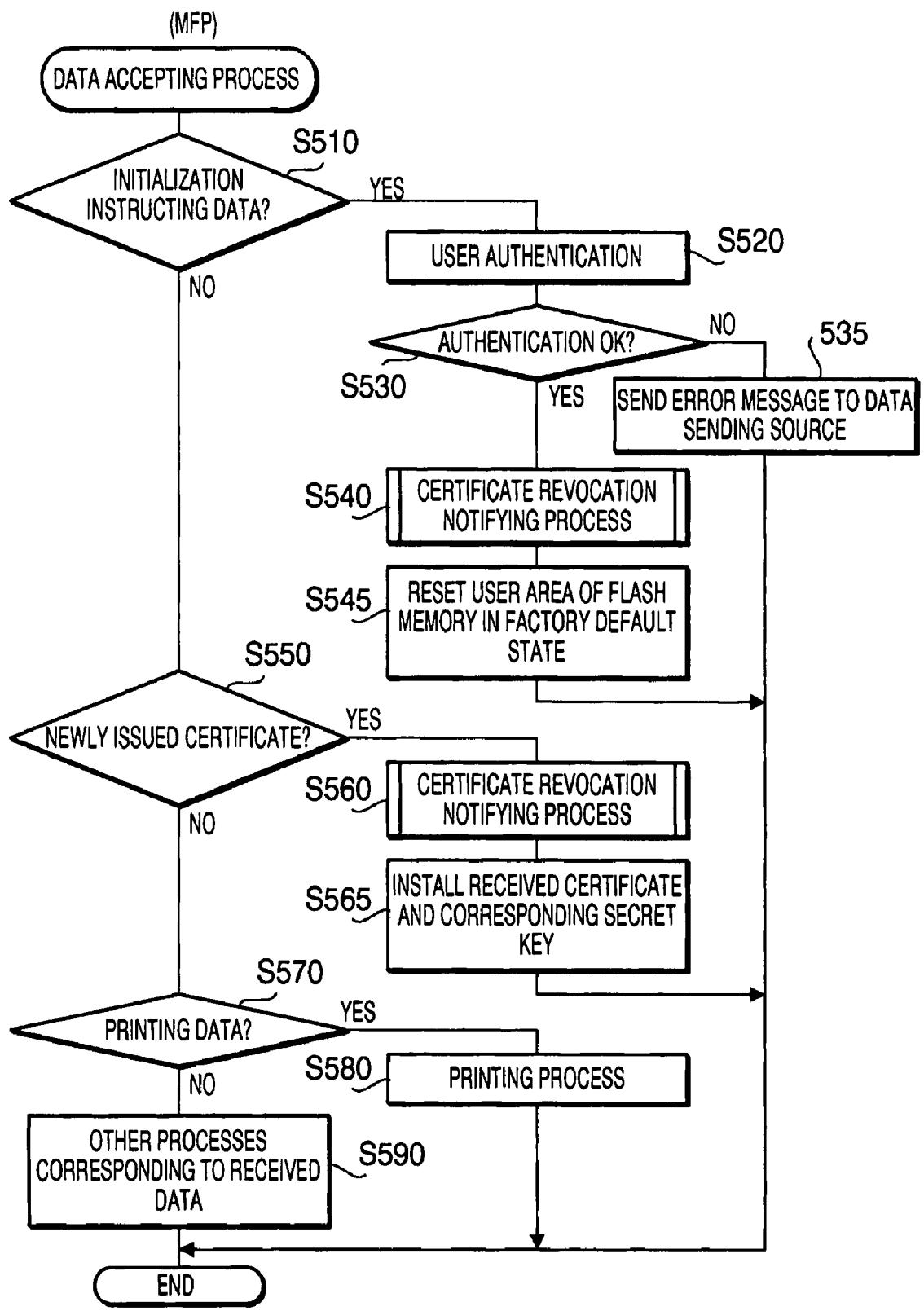
FIG. 7 is a flowchart showing a procedure of a data accepting process to be executed by the CPU of the MFP in accordance with one or more aspects of the present invention.

Meanwhile, when it is not judged that the event is the user operation event (S120: No), the process goes to a step of S140, and it is judged whether the event that has arisen is a data receiving event in which data are received from an external device via the network NT. Namely, it is judged whether the MFP 10 has received communication data from one of the external PCs 50 or the management device 30. When it is judged that the event is data receiving event (S140: Yes), the process goes to a step of S150, and a data accepting process as shown in FIG. 7 is performed. Thereby, the CPU 11 performs a process corresponding to the received data. Thereafter, the main MFP process is once terminated.

When it is judged that the event that has arisen is not the user operation event or the data receiving event, (S140: No), the process goes to a step of S160, and another process corresponding to the event is performed. Thereafter, the main MFP process is once terminated.

Subsequently, the user operation accepting process to be executed by the CPU 11 of the MFP 10 will be explained. FIG. 5 is a flowchart showing the user operation accepting process to be executed by the CPU 11.

When starting the user operation accepting process, the CPU 11 judges whether the user operation performed through the displaying and operating unit 21 is an initialization instructing operation that instructs to initialize the flash memory 13 or a deletion instructing operation that instructs to uninstall the secret key and electronic certificate as currently installed (S210). When it is judged that the user operation performed through the displaying and operating unit 21 is the initialization instructing operation or the deletion instructing operation (S210: Yes), the process goes to a step of S220. Meanwhile, when it is not judged that the user operation performed through the displaying and operating unit 21 is the initialization instructing operation or the deletion instructing operation (S210: No), the process goes to a step of S260.

In S220, the CPU 11 performs user authentication. For example, the CPU 11 displays a message that requests to input a password on the display device provided to the displaying and operating unit 21, and obtains the password from the user through the operating keys of the displaying and operating unit 21. Thereafter, the CPU 11 judges whether the user who has performed the operation is a proper user (administrator) by checking whether the password is identical to a password that is previously registered in the user area of the flash memory 13.

When the user is judged to be the proper user, the CPU 11 judges that the user authentication is successful (S230: Yes), and the process goes to a step of S240. Meanwhile, when the user is not judged to be the proper user, the CPU 11 does not judge that the user authentication is successful (S230: No), and terminates the user operation accepting process after displaying an error message on the display device (S235).

Figure 6:
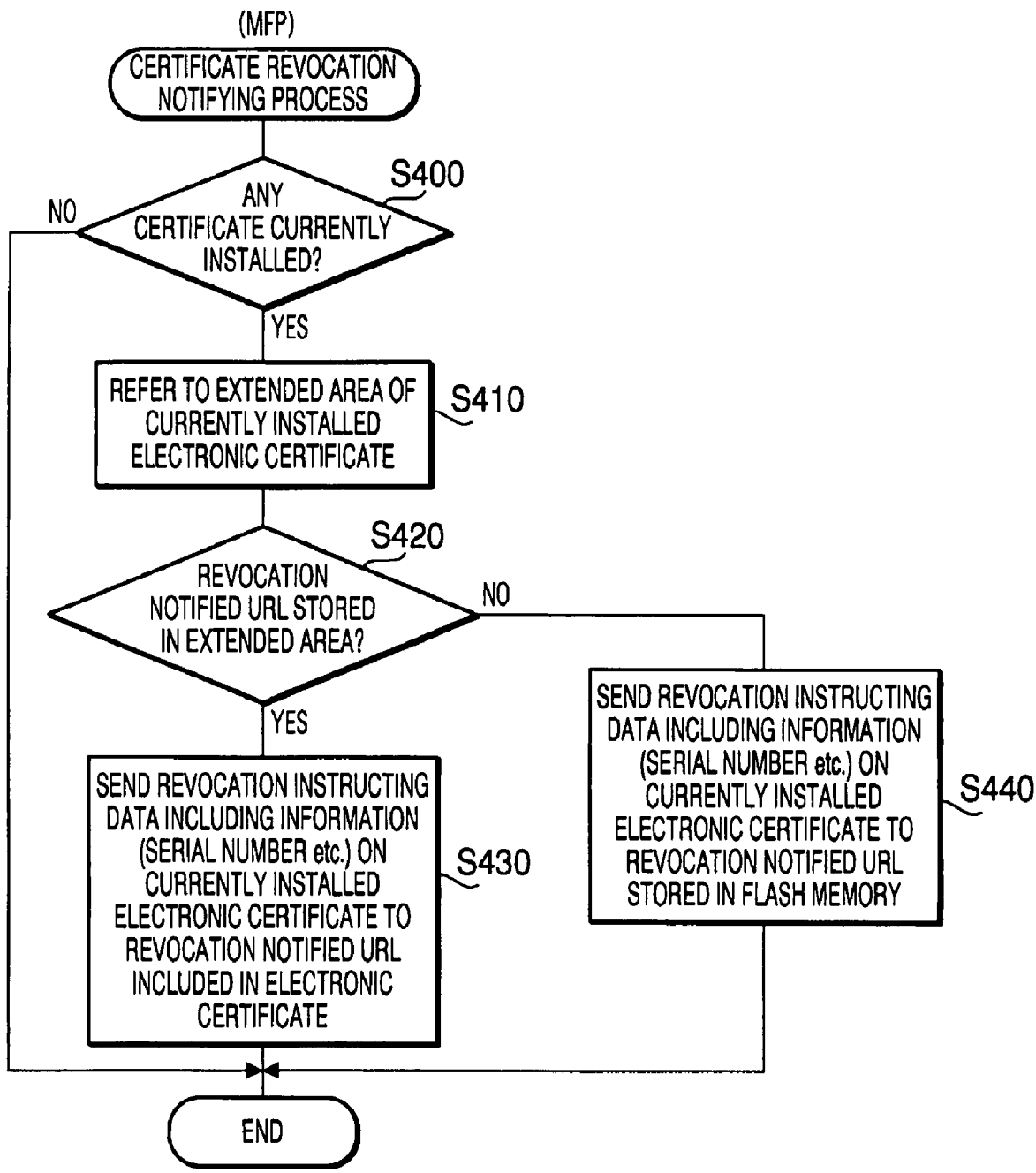
FIG. 6 is a flowchart showing a procedure of a certificate revocation notifying process to be executed by the CPU of the MFP in accordance with one or more aspects of the present invention.

Additionally, in S240, the CPU 11 performs a certificate revocation notifying process as shown in FIG. 6, and registers in the CRL the electronic certificate currently installed in the user area of the flash memory 13. Particularly, the CPU 11 performs the certificate revocation notifying process in accordance with the followings. FIG. 6 is a flowchart showing the certificate revocation notifying process to be executed by the CPU 11.

When starting the certificate revocation notifying process, the CPU 11 firstly judges whether the secret key and electronic certificate are present in the user area of the flash memory 13 (S400). When it is not judged that the secret key and electronic certificate are present in the user area of the flash memory 13 (S400: No), the certificate revocation notifying process is terminated.

Meanwhile, when it is judged that the secret key and electronic certificate are present in the user area of the flash memory 13 (S400: Yes), the CPU 11 reads out the secret key and electronic certificate installed in the user area of the flash memory 13. Then, the CPU 11 refers to the extended area of the electronic certificate (S410), and judges whether the aforementioned revocation notified URL information is stored in the extended area of the electronic certificate (S420). It is noted that, in the embodiment, the flash memory 13 can store up to one pair of the electronic certificate and secret key in accordance with a specification of the MFP 10.

When it is judged that the aforementioned revocation notified URL information is stored in the extended area of the electronic certificate (S420: Yes), by sending revocation instructing data for instructing to revoke the electronic certificate to a URL represented by the revocation notified URL information of the electronic certificate installed in the user area, the CPU 11 causes the management device 30 represented by the URL to register information on the electronic certificate to be revoked in the CRL (S430).

Specifically, by sending revocation instructing data including the serial number of the electronic certificate to be revoked, the CPU 11 causes the management device 30 represented by the URL to register revocation information representing the serial number of the electronic certificate to be revoked. After this step, the CPU 11 terminates the certificate revocation notifying process.

Meanwhile, when it is not judged that the aforementioned revocation notified URL information is stored in the extended area of the electronic certificate (S420: No), the process goes to a step of S440. Then, according to the revocation notified URL information that is previously registered in the user area of the flash memory 13, the CPU 11 sends the revocation instructing data that instructs to revoke the aforementioned electronic certificate as installed to the URL represented by the revocation notified URL information. Thereby, the CPU 11 causes the management device 30 represented by the URL to register the information on the electronic certificate to be revoked in the CRL (S440).

It is noted that the revocation notified URL information registered in the flash memory 13 is registered in the flash memory 13 by user input of the URL through the operating keys. The URL information serves as preliminary information that allows the electronic certificate to be registered in the CRL when the CRL is not included in the extended area of the electronic certificate. In addition, after the step of S440 has been completed in this manner, the CPU 11 terminates the certificate revocation informing process.

After terminating the certificate revocation informing process in S240, the CPU 11 advances the user operation accepting process to S250 to judge whether an operation that caused the user operation accepting process to be executed was the initialization instructing operation. When it is judged that the operation that caused the execution of the user operation accepting process was the initialization instructing operation (S250: Yes), the CPU 11 advances the process to S253 to clear the user area of the flash memory 13. Thereafter, factory default values stored in the system area of the flash memory 13 are written into the user area of the flash memory 13 (namely, the user area of the flash memory 13 is reset in a factory default state). Then, the user operation accepting process is terminated.

It is noted that, in S253, the electronic certificate and secret key stored in the user area are deleted from the flash memory 13, and communication setting data that regulates the communication operation are once lost such that the communication setting is reset in the factory default state.

Meanwhile, when it is judged that the operation that caused the execution of the user operation accepting process was not the initialization instructing operation but the deletion instructing operation (S250: No), the CPU 11 advances the process to S257 to uninstall the secret key and electronic certificate currently installed in the user area of the flash memory 13. Thereafter, the use operation accepting process is terminated.

In the meantime, when making judgment of "No" in S210 and advancing the process to S260, the CPU 11 judges that the operation that caused the execution of the user operation accepting process was a key updating operation. When it is judged that the operation that caused the execution of the user operation accepting process was the key updating operation (S260: Yes), the CPU 11 advances the process to S270 to perform the user authentication in the same manner as the step of S220.

When the user authentication is successful (S280: Yes), the CPU 11 advances the process to S290 so as to newly generate a pair of a secret key and public key to be used for the SSL communication (S290). Then, the certificate issue request data that include the generated public key and request to issue the electronic certificate regarding the public key are sent to the CA (such as management device 30) via the network NT (S295). Thereafter, the user operation accepting process is terminated. Meanwhile, when the user authentication is not successful (S280: No), the CPU 11 displays an error message on the displaying operating unit 21 (S285), and terminates the user operation accepting process.

Further, in S260, when it is not judged that the operation that caused the execution of the user operation accepting process was the key updating operation (S260: No), the CPU 11 advances the process to S265 so as to perform another process corresponding to the user operation, Then, the user operation accepting process is terminated.

It is noted that the electronic certificate transmitted from the CA (such as management device 30) as response data to the certificate issue request data transmitted in S295 is installed into the user area of the flash memory 13 together with the secret key in a data accepting process to be executed in S150. FIG. 7 is a flowchart showing the data accepting process to be executed by the CPU 11.

When starting the data accepting process in S150, the CPU 11 firstly judges in a step of S510 whether received data that caused the execution of the data accepting process was initialization instructing data that instruct to initialize the flash memory 13.

When it is judged that the received data that caused the execution of the data accepting process was the initialization instructing data that instructs to initialize the flash memory 13 (S510: Yes), the user authentication is performed based on a password included in the initialization instructing data (S520). Specifically, by checking whether the password included in the initialization instructing data is identical to a password that has previously registered in the user area of the flash memory 13, the CPU 11 judges whether a user of the PC 50 that has transmitted the initialization instructing data is a proper user (administrator).

When it is judged that the user of the PC 50 that has transmitted the initialization instructing data is the proper user (S530: Yes), the process goes to a step of S540. Meanwhile, when it is not judged that the user of the PC 50 that has transmitted the initialization instructing data is the proper user (namely, when it is not judged that the user authentication is successful) (S530: No), an error message is sent to a sending source device of the initialization instructing data (S535). Thereafter, the data accepting process is terminated.

Meanwhile, in S540, the CPU 11 performs the certificate revocation notifying process as shown in FIG. 6 so as to register the electronic certificate currently installed in the user area of the flash memory 13 into the CRL. In addition, after execution of the process, the CPU 11 once clears the user area of the flash memory 13 (data deletion), and then writes the factory default values stored in the system area so as to reset the user area of the flash memory 13 in the factory default state (S545). Thereafter, the data accepting process is terminated.

Meanwhile, in S510, when it is not judged that the received data is the initialization instructing data, the CPU 11 advances the process to S550 so as to judge whether the received data is an electronic certificate (newly issued electronic certificate) sent from the CA (such as the management device 30) in response to the certificate issue request data sent in S295. When the received data are judged to be the newly issued electronic certificate sent from the CA in response to the certificate issue request data sent in S295 (S550: Yes), the CPU 11 advances the process to S560 so as to perform the certificate revocation notifying process as shown in FIG. 6. Thereby, the previous electronic certificate overwritten with the newly issued electronic certificate is registered in the CRL.

Further, after the procedure of registering the previous electronic certificate as overwritten in the CRL has been completed, the CPU 11 advances the process to S565 so as to install, into the user area of the flash memory 13, the newly issued electronic certificate and the secret key that has been generated in pairs with the public key represented by the electronic certificate. Namely, the newly issued electronic certificate and the secret key are installed into the MFP 10 to be usable for the SSL communication. At this time, when the electronic certificate and secret key have already been installed, the CPU 11 installs the newly issued electronic certificate and secret key to overwrite the previous electronic certificate and secret key. After the step of S565 has been completed, the CPU 11 terminates the data accepting process.

Further, when the received data is not judged to be the newly issued electronic certificate (S550: No), the CPU 11 advances the process to S570 so as to judge whether the received data are printing data. When the received data are judged to be the printing data (S570: Yes), the CPU 11 performs the printing process to make the printing unit 17 form an image based on the printing data on a printing paper (S580). Thereafter, the data accepting process is terminated.

Meanwhile, when the received data are not judged to be the printing data (S570: No), the CPU 11 terminates the data accepting process after executing another process corresponding to the received data (S590).

Hereinabove, the operations to be performed by the MFP 10 have been described. Subsequently, there will be explained operations to be performed by the management device 30 that processes the revocation instructing data and certificate issue request data transmitted by the MFP 10. FIG. 8 is a flowchart showing a certificate management process to be repeatedly executed by the CPU 31 of the management device 30 in accordance with the certificate management program.

When starting the certificate management process, the CPU 31 firstly keeps waiting ready until any event arises in the management device 30 (S610). When an event arises (S610: Yes), the CPU 31 advances the process to S620 and hereinafter performs a corresponding process depending on the event that has arisen.

Specifically, in S620, the CPU 31 judges whether the event is a data receiving event in which data are received from an external device via the network NT. Namely, the CPU 31 judges whether the management device 30 has received communication data from one of the external PCs 50 or the MFP 10 via the communication I/F 35. When the event is judged to be the data receiving event (S620: Yes), the process goes to S630.

In S630, the CPU 31 judges whether the received data are the revocation instructing data. When the received data are judged to be the revocation instructing data transmitted by the MFP 10 (S630: Yes), the process goes to S635. In S635, the CPU 31 edits the CRL recorded in the HDD 34 of the management device 30, and adds the electronic certificate specified by the received revocation instructing data to the CRL.

Particularly, the CPU 31 adds, to the CRL, revocation information (record) that includes a serial number and a revocation date and hour of the electronic certificate specified by the revocation instructing data. Further, after completing the step of S635, the CPU 31 once terminates the certificate management process, and keeps waiting ready until a subsequent event arises (S610).

In the meantime, in S630, the received data are not judged to be the revocation instructing data (S630: No), the CPU 31 advances the process to S640 so as to judge whether the received data are CRL request data for requesting the CRL. It is noted that the CRL request data, for example, are transmitted from one of the PCs 50 as a client device in the handshake process for the SSL communication.

When the received data are judged to be the CRL request data (S640: Yes), the CRL recorded in the HDD 34 is sent to the sending source device of the CRL request data via the network NT (S645). It is noted that the CRL is transmitted with the digital signature added thereto at this time.

After the step of S645 has been completed in this manner, the CPU 31 once terminates the certificate management process. Meanwhile, when the received data are not judged to be the CRL request data (S640: No), the CPU 31 judges whether the received data are the certificate issue request data (S650). When the received data are judged to be the certificate issue request data (S650: Yes), the CPU 31 generates the electronic certificate regarding the public key specified by the certificate issue request data, and sends the electronic certificate regarding public key to the sending source device of the certificate issue request data via the network NT (S655).

Specifically, in S655, the CPU 31 generates the electronic certificate that includes the public key specified by the certificate issue request data received as public key information and a node ID (IP address or domain name) of the request source device specified by the certificate issue request data as received. In addition, the valid period information included in the electronic certificate is set such that the electronic certificate will be expired a predetermined period (for example, one year) after the current date and hour. Further, the digital signature information is added to the electronic certificate using the secret key of the management device 30, and a URL for accepting the revocation instructing data is written as revocation notified URL information into the extended area of the electronic certificate.

After the transmission of the electronic certificate has been completed, the certificate management process is once terminated. In addition, when the received data are not judged to be the certificate issue request data (S650: No), the CPU 31 performs another process according to the received data, and once terminates the certificate management process.

Meanwhile, when it is not judged that the event that has arisen is the data receiving event in which data are received from an external device via the network NT (S620: No), the CPU 31 judges whether the aforementioned event is a user operation event in which a user operation is performed through the operating unit 37 (S670). Namely, the CPU 31 judges whether a user of the management device 30 has given any operation to the management device 30 through the operating unit 37. When the event is judged to be the user operation event (S670: Yes), the CPU 31 advances the process to S680 so as to judge whether the aforementioned user operation is an operation for editing the CRL. When the user operation is judged to be the operation for editing the CRL (S680: Yes), the CPU 31 edits and updates the CRL in accordance with the user operation (S683). Thereafter, the certificate management process is once terminated.

Meanwhile, when the user operation is not judged to be the operation for editing the CRL (S680: No), the CPU 31 performs another process corresponding to the user operation, and once terminates the certificate management process.

In addition, when the event that has arisen is not judged to be the user operation event (S670: No), the CPU 31 performs another process corresponding to the event that has arisen (S690), and then terminates the certificate management process.

The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

In the aforementioned embodiment, after the revocation instructing data have been transmitted and the electronic certificate to be deleted has been registered in the CRL, the electronic certificate is deleted. However, for example, even though the CPU 11 installs a new electronic certificate before sending the revocation instructing data, when information on the electronic certificate to be deleted is previously stored in the RAM 12, the CPU 11 can transmits the revocation instructing data for revoking the electronic certificate as overwritten and deleted after installing the new electronic certificate. Therefore, in the steps of S560 to S565, the execution order of the operations of installing the electronic certificate and sending the revocation instructing data may be reversed (namely, the operation of sending the revocation instructing data may be executed before installing the electronic certificate).

What is claimed is:

1. A communication device configured to perform communication with at least one external device via a network using a secret key and an electronic certificate that includes information on a public key corresponding to the secret key, comprising:
 a storing system configured to store the secret key and the electronic certificate, the electronic certificate including address information on an address of the management device that manages the list of revoked electronic certificates; and
 a hardware processor configured to, when executing instructions stored in the storing system, control the communication device to serve as
  a receiving system configured to receive an instruction to delete at least one of the secret key and the electronic certificate stored in the storing system in addition to an instruction to initialize communication settings for the communication device;
  a revocation instructing system configured to instruct, via the network, a management device that manages a list of revoked electronic certificates to register the electronic certificate stored in the storing system with the list in response to the instruction to delete at least one of the secret key and the electronic certificate stored in the storing system and to instruct, via the network, a management device that manages a list of revoked electronic certificates to register the electronic certificate stored in the storing system with the list in response to the instruction to initialize communication settings for the communication device received by the receiving system, said management device being a management device corresponding to the address information included in the electronic certificate stored in the storing system;
  an initializing system configured to initialize communication settings for the communication device by resetting a user area of said storing system including deleting the secret key and electronic certificate stored in the storing system in response to the instruction to initialize communication settings for the communication device received by the receiving system; and
  a deleting system configured to delete the at least one of the secret key and the electronic certificate stored in the storing system in response to the instruction to delete at least one of the secret key and the electronic certificate stored in the storing system received by the receiving system.

2. The communication device according to claim 1, wherein the receiving system is configured to receive an instruction to register a second secret key and a second electronic certificate that includes information on a second public key corresponding to the second secret key into the storing system, and wherein the deleting system includes a registering system configured to delete the secret key and electronic certificate stored in the storing system so as to register the second secret key and the second electronic certificate that includes the information on the second public key corresponding to the second secret key into the storing system in response to the instruction to register received by the receiving system.

3. The communication device according to claim 2, wherein the registering system is configured to delete the electronic certificate after the electronic certificate stored in the storing system has been registered with the list in response to the instructing operation by the revocation instructing system.

4. The communication device according to claim 1, wherein the deleting system is configured to delete the at least one of the secret key and electronic certificate stored in the storing system after the electronic certificate has been registered with the list in response to the instructing operation by the revocation instructing system.

5. The communication device according to claim 1, wherein the initializing system is configured to delete the electronic certificate after the electronic certificate stored in the storing system has been registered with the list in response to the instructing operation by the revocation instructing system.

6. The communication device according to claim 1, wherein the initialize communication settings includes at least one factory set parameter.

7. The communication device according to claim 1, wherein the communication device is a multi-function peripheral device.

8. The communication device according to claim 1, wherein the receiving system is a user input device configured to receive a local instruction to delete at least one of the secret key and the electronic certificate stored in the storing system in addition to an instruction to initialize communication settings for the communication device.

9. A computer readable storage device having computer readable instructions stored thereon, which, when executed by a computer that stores a secret key and an electronic certificate corresponding to the secret key as information for communication in a predetermined memory area, the electronic certificate including address information on an address of the management device that manages the list of revoked electronic certificates, cause the computer to perform steps of:

receiving an instruction to delete at least one of the secret key and the electronic certificate stored in the predetermined memory area in addition to an instruction to initialize communication settings for the communication device;

instructing a management device that manages a list of revoked electronic certificates to register the electronic certificate stored in the predetermined memory area in response to the instruction to delete at least one of the secret key and the electronic certificate stored in the predetermined memory area with the list and to instruct, via the network, a management device that manages a list of revoked electronic certificates to register the electronic certificate stored in the predetermined memory area with the list in response to the instruction to initialize communication settings for the communication device, the management device being a management device corresponding to the address information included in the electronic certificate stored in the predetermined memory area;

initializing communication settings for the communication device by resetting a user area of the predetermined memory area including deleting the secret key and electronic certificate stored in the predetermined memory area in response to the instruction to initialize communication settings for the communication device; and deleting the at least one of the secret key and the electronic certificate stored in the predetermined memory area in response to the instruction to delete at least one of the secret key and the electronic certificate stored in the predetermined memory area.

* * * * *